(12) United States Patent
Evers

(10) Patent No.: US 12,407,425 B2
(45) Date of Patent: Sep. 2, 2025

(54) INTERFERENCE SUPPRESSION MODULE AND ASSOCIATED METHODS

(71) Applicant: NXP B.V., Eindhoven (NL)

(72) Inventor: Rainer Evers, Hamburg (DE)

(73) Assignee: NXP B.V., Eindhoven (NL)

( * ) Notice: Subject to any disclaimer, the term of this patent is extended or adjusted under 35 U.S.C. 154(b) by 499 days.

(21) Appl. No.: 18/052,522

(22) Filed: Nov. 3, 2022

(65) Prior Publication Data
US 2023/0155694 A1    May 18, 2023

(30) Foreign Application Priority Data
Nov. 17, 2021    (EP) ..................... 21208800

(51) Int. Cl.
| | | |
|---|---|---|
| *H04B 1/38* | (2015.01) | |
| *H04B 1/40* | (2015.01) | |
| *H04B 15/02* | (2006.01) | |
| *H04B 3/02* | (2006.01) | |

(52) U.S. Cl.
CPC ............ *H04B 15/02* (2013.01); *H04B 1/40* (2013.01); *H04B 3/02* (2013.01)

(58) Field of Classification Search
CPC ......... H04B 15/00; H04B 15/02; H04B 1/38; H04B 1/40
See application file for complete search history.

(56) References Cited

U.S. PATENT DOCUMENTS

| | | | | |
|---|---|---|---|---|
| 6,442,142 B1 * | 8/2002 | Bar-Niv | ............... | H04B 17/327 |
| | | | | 370/252 |
| 8,938,035 B1 * | 1/2015 | Dai | ...................... | H03M 13/41 |
| | | | | 714/796 |
| 10,925,097 B2 | 2/2021 | Beruto et al. | | |
| 11,108,842 B2 | 8/2021 | Pandey | | |
| 11,115,141 B2 | 9/2021 | Pandey | | |
| 2004/0028074 A1 * | 2/2004 | Huff | ..................... | H04L 69/323 |
| | | | | 370/463 |

(Continued)

OTHER PUBLICATIONS

IEEE Computer Society, Developed by the LAN/MAN Standards Committee; IEEE Standard for Ethernet, Amendment 5: Physical Layers Specifications and Management Parameters for 10 Mb/s Operation and Associated Power Delivery over a Single Balanced Pair of Conductors, IEEE Std 802.3CG-2019; New York, NY, USA; 256 pages (Nov. 2019).

*Primary Examiner* — Tuan Pham

(57) ABSTRACT

An interference suppression module for an Ethernet transceiver, the interference suppression module comprising circuitry configured to: receive a receiver output from a receiver module of the Ethernet transceiver, the receiver module configured to output a logic-high when a received voltage signal is higher than a receiver threshold, and output a logic-low when the received voltage signal is lower than the receiver threshold; receive an energy detection output from an energy detection module of the Ethernet transceiver, the energy detection module configured to output a logic-high when the received voltage signal is higher than a positive energy detection threshold or lower than a negative energy detection threshold, and output a logic-low when the received voltage signal is between the positive and negative energy detection thresholds; and output a predefined logic state to a receive pin of the Ethernet transceiver when the energy detection output is a logic-low.

20 Claims, 4 Drawing Sheets

(56) References Cited

U.S. PATENT DOCUMENTS

2005/0026581 A1    2/2005   Wood
2017/0277249 A1    9/2017   Low et al.
2019/0334642 A1   10/2019   Pandey
2021/0334232 A1   10/2021   Islinger et al.

* cited by examiner

INTERFERENCE SUPPRESSION MODULE AND ASSOCIATED METHODS

CROSS-REFERENCE TO RELATED APPLICATIONS

This application claims the priority under 35 U.S.C. § 119 of European patent application no. 21208800.9, filed Nov. 17, 2021 the contents of which are incorporated by reference herein.

FIELD

The present disclosure relates to Ethernet networks, and in particular concerns an apparatus and associated methods for suppressing interference on the receive pin of an Ethernet transceiver.

BACKGROUND

Interference on the signal line of an Ethernet network can degrade the signal-to-noise ratio of a received voltage signal. The apparatus and associated methods described herein may address this issue.

SUMMARY

According to a first aspect of the present disclosure, there is provided an interference suppression module for an Ethernet transceiver, the interference suppression module comprising circuitry configured to:
  a. receive a receiver output from a receiver module of the Ethernet transceiver, the receiver module configured to output a logic-high when a received voltage signal is higher than a receiver threshold, and output a logic-low when the received voltage signal is lower than the receiver threshold;
  b. receive an energy detection output from an energy detection module of the Ethernet transceiver, the energy detection module configured to output a logic-high when the received voltage signal is higher than a positive energy detection threshold or lower than a negative energy detection threshold, and output a logic-low when the received voltage signal is between the positive and negative energy detection thresholds; and
  c. output a predefined logic state to a receive pin of the Ethernet transceiver when the energy detection output is a logic-low.

In one or more embodiments, the circuitry may comprise an AND gate configured to receive the receiver output from the receiver module and the energy detection output from the energy detection module and output a logic-low to the receive pin when the energy detection output is a logic-low.

In one or more embodiments, the circuitry may comprise a NAND gate configured to receive the receiver output from the receiver module and the energy detection output from the energy detection module and output a logic-high to the receive pin when the energy detection output is a logic-low.

In one or more embodiments, the circuity may be configured to output the predefined logic state to the receive pin when the energy detection output is a logic-low for a predefined time.

In one or more embodiments, the circuitry may comprise a time-delay unit configured to receive the energy detection output from the energy detection module and, when the energy detection output is a logic-low for a predefined time, pass the energy detection output to the (N)AND gate.

In one or more embodiments, the circuitry may be configured to pass the receiver output to the receive pin when the energy detection output is a logic-high.

In one or more embodiments, the circuitry may be configured to output the energy detection output to an energy detection pin of the Ethernet transceiver.

In one or more embodiments, the circuitry may comprise a time-delay unit configured to receive the energy detection output from the energy detection module and, when the energy detection output is a logic-low for a predefined time, pass the energy detection output to the energy detection pin.

According to a second aspect of the present disclosure, there is provided an Ethernet transceiver comprising the interference suppression module of the first aspect.

In one or more embodiments, the receiver and energy detection modules may each comprise one or more comparators for comparing the received voltage signal with the respective thresholds, and one or more low-pass filters configured to remove noise from the outputs of the comparators.

In one or more embodiments, the energy detection module may comprise first and second comparators for comparing the received voltage signal with the respective positive and negative energy detection thresholds, and a XOR gate configured to provide the energy detection output based on the outputs of the first and second comparators.

In one or more embodiments, the receiver threshold may comprise a predefined hysteresis.

In one or more embodiments, the Ethernet transceiver may further comprise one or more signal pins connectable to a signal line for receiving the received voltage signal over an Ethernet network.

In one or more embodiments, the one or more signal pins may be configured to be connected to a signal line comprising a single unshielded twisted pair.

In one or more embodiments, the received voltage signal may be a differential voltage signal.

In one or more embodiments, the Ethernet transceiver may be a 10BASE-T1S transceiver.

According to a third aspect of the present disclosure, there is provided an Ethernet Physical Layer comprising the Ethernet transceiver of the second aspect.

According to a fourth aspect of the present disclosure, there is provided a method of interference suppression in an analog frontend of an Ethernet Physical Layer, the method comprising:
  a. receiving a receiver output from a receiver module, the receiver module configured to output a logic-high when a received voltage signal is higher than a receiver threshold, and output a logic-low when the received voltage signal is lower than the receiver threshold;
  b. receiving an energy detection output from an energy detection module, the energy detection module configured to output a logic-high when the received voltage signal is higher than a positive energy detection threshold or lower than a negative energy detection threshold, and output a logic-low when the received voltage signal is between the positive and negative energy detection thresholds; and
  c. outputting a predefined logic state to a receive data output pin of the analog frontend when the energy detection output is a logic-low.

According to a fifth aspect of the present disclosure, there is provided a computer program comprising computer code configured to control the interference suppression module of the first aspect, control the Ethernet transceiver of the second aspect, control the Ethernet Physical Layer of the third aspect, or perform the method of the fourth aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Ethernet Standards

While much of the focus in recent Ethernet development has centred on high data rates, not every application requires speeds of up to 400 Gbps. For some applications, including Internet of Things (IoT), industrial and automotive, 10 Mbps is sufficient. Factors like cost, weight, distance and the space required for cable are more important for these use cases.

Recognizing these evolving requirements, IEEE began work in early 2017 to define IEEE 802.3cg, a standard for single-pair Ethernet that supports 10 Mbps. The goals of IEEE 802.3cg were to define a point-to-point and a multi-drop short-distance standard with a maximum length of 25 meters, and a long-distance point-to-point standard that supports distances up to 1,000 meters. The resulting IEEE 802.3cg specification includes two link-layer standards: 10BASE-T1S and 10BASE-T1L.

The 10BASE-T1S short-range standard is primarily targeted at automotive and industrial applications. Multiple nodes on the network can share a cable in half-duplex shared-medium mode (multidrop mode) using the standard Ethernet Carrier-Sense Multiple Access with Collision Detection (CSMA/CD) access method or operate using PHY-Level Collision Avoidance (PLCA). The cable is an unshielded twisted pair (UTP) that may have multiple medium dependent interfaces (MDIs) attached thereto. As such, 10BASE-T1S may also be referred to as Multidrop Single Pair Ethernet (MSPE).

The 10BASE-T1L long-range option is designed for IoT and industrial control applications. The 1,000-meter range is sufficient for use in large factories or warehouses, and 10 Mbps is sufficient for gathering data from sensors and to monitor and control many types of industrial machinery. It shares the advantages of the short network variant: compatibility with four-pair Ethernet and lower cost, weight and required space.

The following description relates to the 10BASE-T1S standard but may be also applicable to other (including future) Ethernet standards and is therefore not necessarily limited to 10BASE-T1S.

Technical Problem

Figure 1:
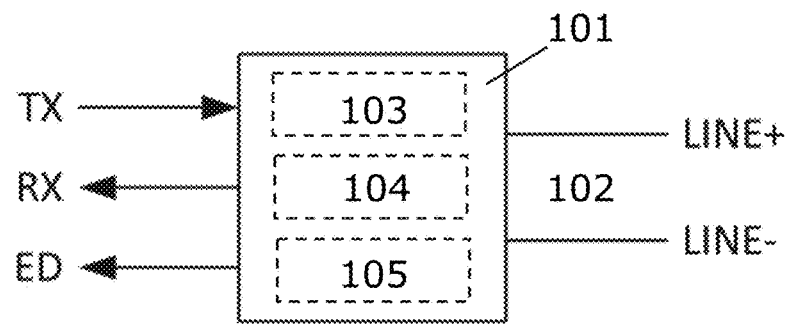
FIG. 1 shows an example embodiment of an Ethernet transceiver.

FIG. 1 shows one example of an Ethernet transceiver 101 connected to a signal line 102. The signal line 102 comprises positive (LINE+) and negative (LINE−) lines formed as an unshielded twisted pair (UTP) suitable for conveying differential voltage signals, and the Ethernet transceiver 101 comprises a corresponding pair of signal pins configured for connection to the respective lines of the UTP.

The Ethernet transceiver 101 further comprises a transmitter module 103 for processing outgoing (egress) data into a suitable signal form for transmission to other nodes on the Ethernet network, a receiver module 104 for processing incoming signals from other nodes on the Ethernet network into a suitable data form for the higher layers of the protocol stack, and an energy detection module 105 for detecting activity on the signal line 102 from other nodes on the Ethernet network.

In this example, an Ethernet Physical Layer (PHY) is split into a digital PHY part and an analog frontend part. The transceiver shown in FIG. 1 is the analog front end part and is configured to interface with the digital PHY using three pins: a transmit pin TX for conveying outgoing data from the digital PHY to the transmission module 103; a receive pin RX for conveying incoming (ingress) data from the receiver module 104 to the digital PHY; and an energy detection pin ED for conveying activity detected by the energy detection module 105 to the digital PHY.

When at least one of the nodes on the Ethernet network is transmitting data, the signal line 102 is said to be in an "active" state. On the contrary, when none of the nodes on the Ethernet network are transmitting data, the signal line 102 is said to be in a "silence" state. In the silence state, the differential voltage signal received by the Ethernet transceiver 101 is around 0V. Nevertheless, interference on the signal line 102 can result in unwanted oscillations on the receive pin RX which degrade the signal-to-noise ratio of the received voltage signal.

Figure 2:
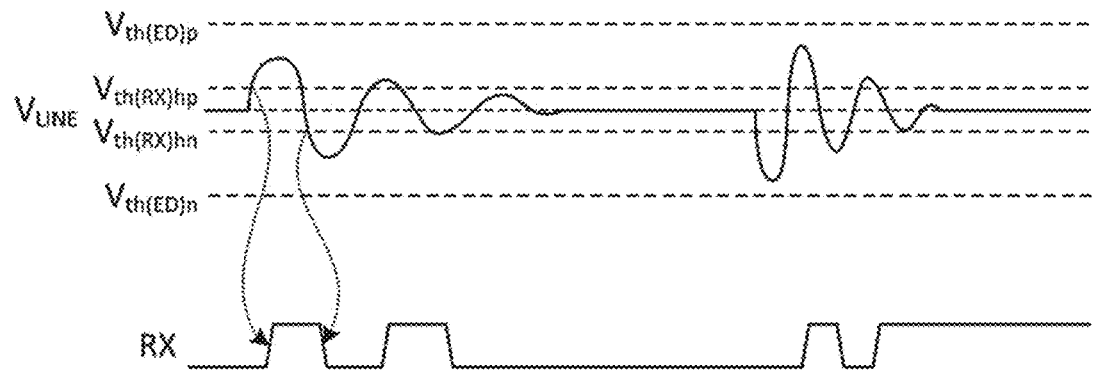
FIG. 2 shows how interference on the signal line can result in unwanted oscillations on the receive pin.

FIG. 2 shows how interference on the signal line 102 in the silence state can result in unwanted oscillations on the receive pin RX. The receiver module 104 is configured to output a logic-high (i.e. binary "1") when a received voltage signal $V_{LINE}$ is higher than a receiver threshold and output a logic-low (i.e. binary "0") when the received voltage signal $V_{LINE}$ is lower than the receiver threshold. In some examples the threshold may be set to 0V, but in this example the receiver threshold comprises a predefined hysteresis (e.g. ±30 mV) to reduce the effect of noise on the receive pin RX. The receiver module 104 therefore effectively has both positive $V_{th(RX)hp}$ and negative $V_{th(RX)hn}$ receiver thresholds. The energy detection module 105, on the other hand, is configured to output a logic-high when the received voltage signal $V_{LINE}$ is higher than a positive energy detection threshold $V_{th(ED)p}$ or lower than a negative energy detection threshold $V_{th(ED)n}$, and output a logic-low when the received voltage signal $V_{LINE}$ is between the positive $V_{th(ED)p}$ and negative $V_{th(ED)n}$ energy detection thresholds.

As can be seen in FIG. 2, the received voltage signal $V_{LINE}$ in the silence state typically remains between the positive $V_{th(ED)p}$ and negative $V_{th(ED)n}$ energy detection thresholds because the voltage is merely noise attributed to interference on the signal line 102. However, the magnitude of this noise is often sufficient to exceed the positive $V_{th(RX)hp}$ and negative $V_{th(RX)hn}$ receiver thresholds, which causes the receiver module 104 to output a logic-high each time this occurs. The Ethernet transceiver 101 therefore effectively conveys false positives to the digital PHY when none of the nodes are transmitting on the Ethernet network.

Embodiments of the Present Disclosure

Figure 3:
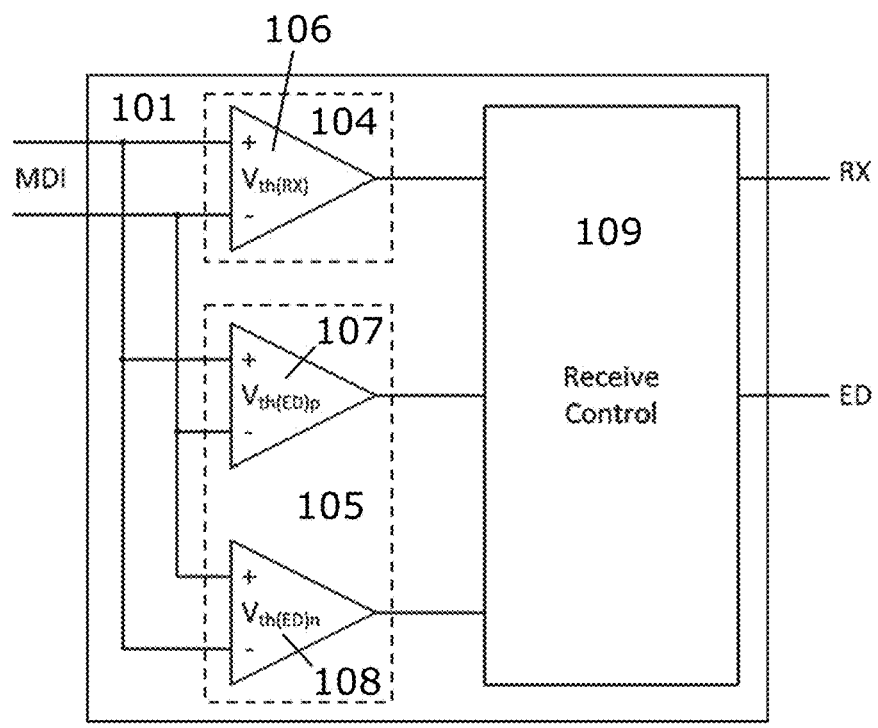
FIG. 3 shows an example embodiment of an Ethernet transceiver comprising an interference suppression module.

FIG. 3 shows one example embodiment of an Ethernet transceiver 101. As per FIG. 1, the Ethernet transceiver 101 comprises a pair of signal pins for connection to a signal line MDI as well as receive RX and energy detection ED pins for interfacing with the digital PHY. The Ethernet transceiver 101 further comprises a receiver module 104 and an energy detection module 105 as described above. In this example, the receiver module 104 comprises a receiver comparator 106 for comparing the received voltage signal $V_{LINE}$ with the receiver threshold $V_{th(RX)}$, and the energy detection module 105 comprises first 107 and second 108 energy detection comparators for comparing the received voltage signal $V_{LINE}$ with the positive $V_{th(ED)p}$ and negative $V_{th(ED)n}$ energy detection thresholds respectively.

To address the above-mentioned technical problem, the Ethernet transceiver 101 of FIG. 3 also comprises an interference suppression module 109. As will be described in more detail later, the interference suppression module 109 comprises circuitry configured to receive a receiver output from the receiver module 104, receive an energy detection output from the energy detection module 105 and output a predefined logic state to the receive pin RX when the energy detection output is a logic-low. In this example, the output received from the energy detection module 105 comprises a first energy detection output from the first energy detection comparator 107 and a second energy detection output from the second energy detection comparator 108.

By outputting a predefined logic state to the receive pin RX when the energy detection output is a logic-low, the energy detection output effectively gates the receiver output when the signal line MDI is in the silence state. This is possible because the receiver output is irrelevant in the silence state. In practice, the predefined logic state may be a logic-low or a logic-high. The circuitry of the interference suppression module 109 is also configured to pass the receiver output to the receive pin RX when the energy detection output is a logic-high (i.e. when the signal line MDI is in the active state).

Figure 4:
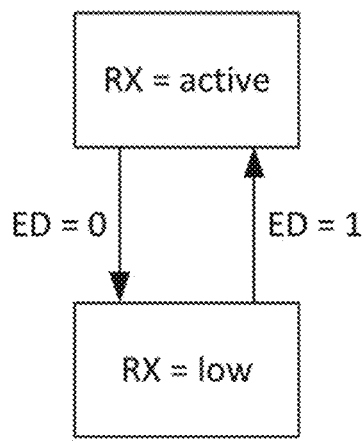
FIG. 4 shows a state diagram example for the interference suppression on the receive pin.

FIG. 4 shows a state diagram for when the predefined logic state is a logic-low. In this scenario, the receiver output is blocked when the energy detection output is a logic-low (ED=0) thereby resulting in a logic-low being output to the receive pin RX (RX=low). When the energy detection output is a logic-high (ED=1), on the other hand, the receiver output is passed to the receive pin RX instead (RX=active).

Figure 5:
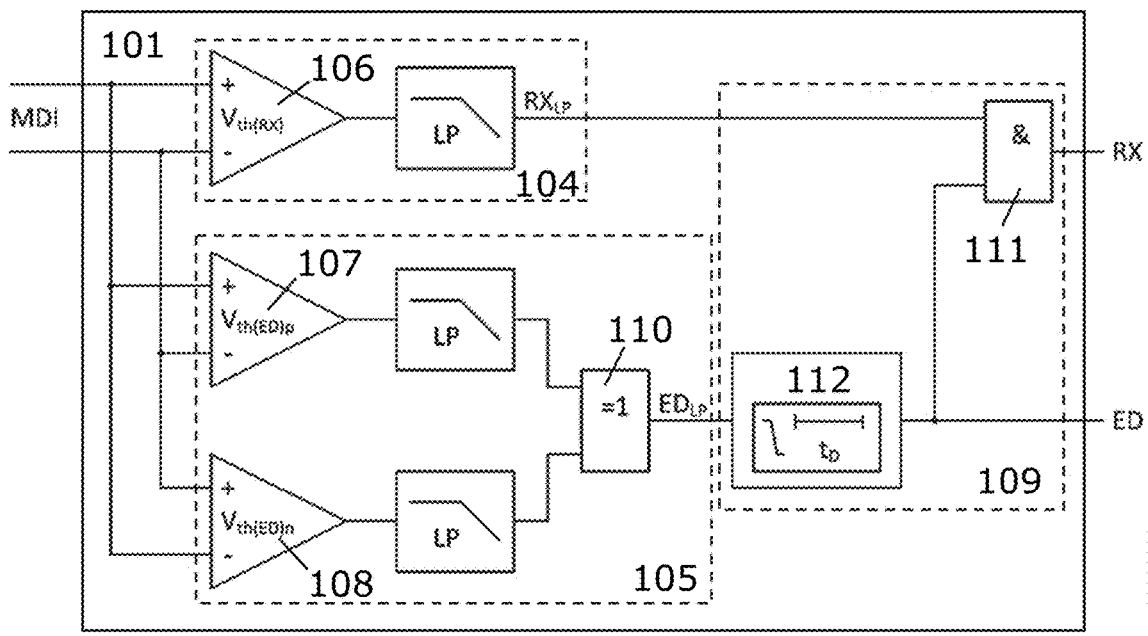
FIG. 5 shows an example embodiment of an Ethernet transceiver comprising an interference suppression module configured to implement the state diagram of FIG. 4.

FIG. 5 shows one example of an Ethernet transceiver 101 configured to implement the functionality of FIG. 4. In this example, the receiver module 104 comprises a low-pass filter LP connected to the output of the receiver comparator 106 to remove any higher frequency noise from the receiver output $RX_{LP}$. Similarly, the energy detection module 105 comprises first and second low-pass filters LP connected to the output of the respective first 107 and second 108 energy detection comparators to remove any higher frequency noise from the energy detection output $ED_{LP}$. Furthermore, the outputs of the first and second low-pass filters LP of the energy detection module 105 are then passed through a XOR gate 110. As such, the output of the XOR gate 110 can be considered as the energy detection output $ED_{LP}$ as indicated.

In this example, the circuitry of the interference suppression module 109 comprises an AND gate 111 configured to receive the receiver output $RX_{LP}$ from the receiver module 104 and the energy detection output $ED_{LP}$ from the energy detection module 105. When the signal line MDI is in the silence state, the received voltage signal is between the positive $V_{th(ED)p}$ and negative $V_{th(ED)n}$ energy detection thresholds resulting in a logic-low as the energy detection output $ED_{LP}$. Regardless of whether the receiver output $RX_{LP}$ is a logic-high or a logic-low, the AND gate 111 will output a logic-low to the receive pin RX thereby removing the unwanted oscillations caused by interference on the signal line MDI.

In order to prevent unwanted low pulses on the output of the energy detection pin ED during zero crossing of the received voltage signal, the circuitry is configured to output the predefined logic state to the receive pin RX only when the energy detection output $ED_{LP}$ is a logic-low for a predefined time (e.g. 30 ns). To achieve this, a time-delay unit 112 is configured to receive the energy detection output $ED_{LP}$ from the energy detection module 105 and, when the energy detection output $ED_{LP}$ is a logic-low for a predefined time $t_D$, pass the energy detection output $ED_{LP}$ to the AND gate 111. However, the time-delay unit 112 only affects the energy detection output $ED_{LP}$ when it is a logic-low. When the energy detection output $ED_{LP}$ is a logic-high, it is passed to the AND gate 111 and energy detection pin ED without delay. The time-delay unit 112 may comprise a counter, an RC circuit or one or more logic gates.

As shown in FIG. 5, the circuitry of the interference suppression module 109 is also configured to pass the energy detection output $ED_{LP}$ to the energy detection pin ED. However, due to the time-delay unit 112 being connected between the energy detection module 105 and the energy detection pin ED, there is a time delay before a logic-low is received at the energy detection pin ED.

Figure 6:
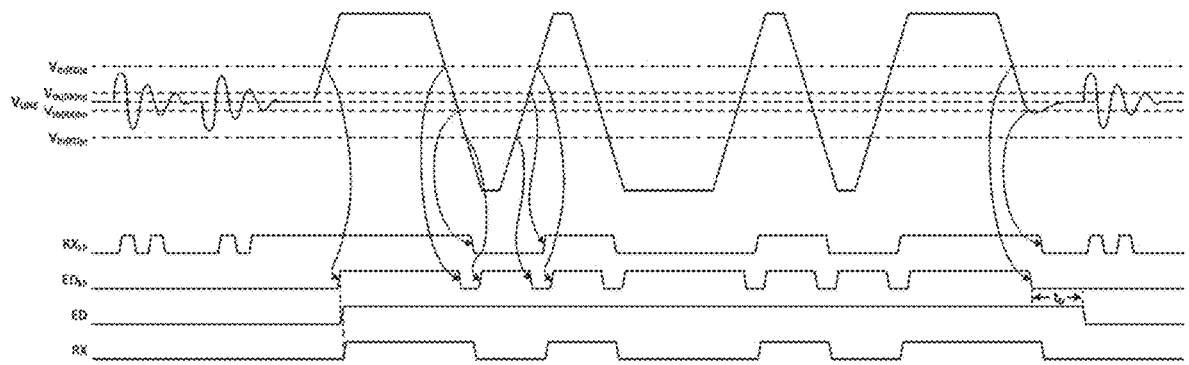
FIG. 6 shows the effect of the interference suppression module of FIG. 5 on the output of the receive pin.

FIG. 6 shows graphically how the receiver output $RX_{LP}$, the energy detection output $ED_{LP}$, the energy detection pin output ED and the receive pin output RX vary in response to a received voltage signal $V_{LINE}$ for the Ethernet transceiver 101 of FIG. 5. In this example, the received voltage signal $V_{LINE}$ is representative of the signal line MDI being in the silence state, then the active state and then back to the silence state again. This is clear from the higher-frequency lower-amplitude peaks associated with noise on the signal line MDI during the silence state, and the lower-frequency higher-amplitude peaks associated with data received from other nodes during the active state. In the silence state, despite the oscillations in the receiver output $RX_{LP}$, the receive pin output RX remains constant. Furthermore, as can be seen by comparing the traces for the energy detection output $ED_{LP}$ and the energy detection pin output ED, the time-delay unit 112 has helped to reduce the number of peaks during the active state. As a result, the receive pin output RX is more representative of the received data.

As mentioned previously, the predefined logic state output to the receive pin RX when the signal line MDI is in the silence state could be a logic-high rather than a logic-low.

Figure 7:
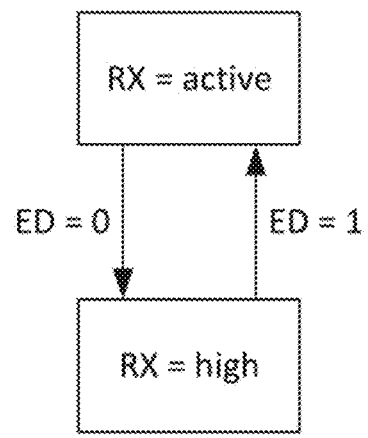
FIG. 7 shows another state diagram example for the interference suppression on the receive pin.

FIG. 7 shows a state diagram for when the predefined logic state is a logic-high. In this scenario, the receiver output is blocked when the energy detection output is a logic-low (ED=0) thereby resulting in a logic-high being output to the receive pin RX (RX=high). When the energy detection output is a logic-high (ED=1), on the other hand, the receiver output is passed to the receive pin RX instead (RX=active).

Figure 8:
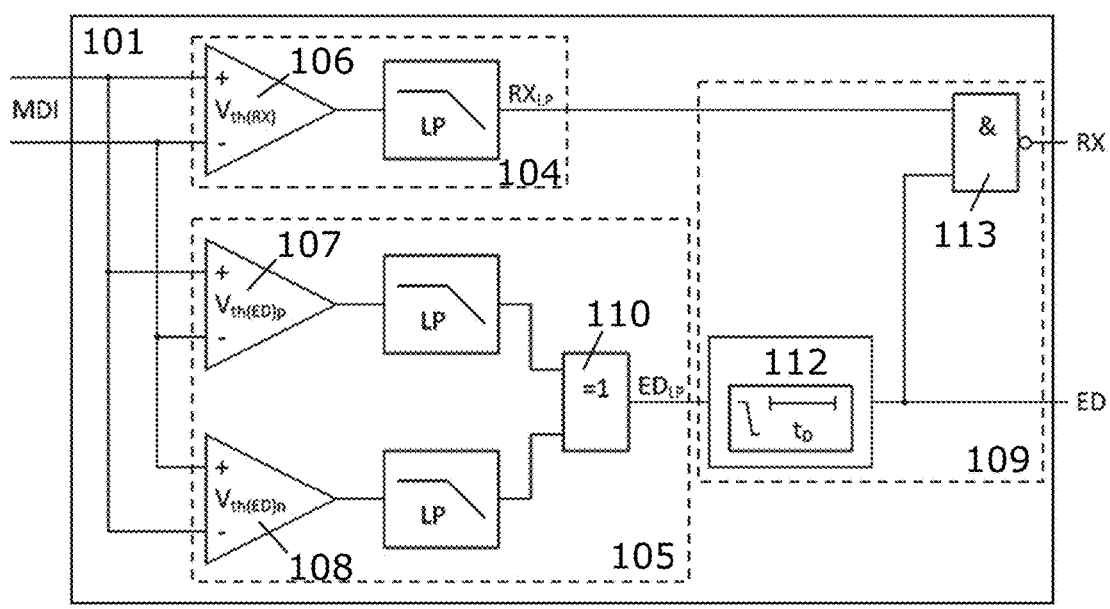
FIG. 8 shows an example embodiment of an Ethernet transceiver comprising an interference suppression module configured to implement the state diagram of FIG. 7.

FIG. 8 shows one example of an Ethernet transceiver 101 configured to implement the functionality of FIG. 7. The Ethernet transceiver 101 is identical to that of FIG. 5 except the AND gate 111 in the interference suppression module 109 has been replaced with a NAND gate 113. The NAND gate 113 is configured to receive the receiver output $RX_{LP}$ from the receiver module 104 and the energy detection output $ED_{LP}$ from the energy detection module 105. When the signal line MDI is in the silence state, the received voltage signal is between the positive $V_{th(ED)p}$ and negative $V_{th(ED)n}$ energy detection thresholds resulting in a logic-low as the energy detection output $ED_{LP}$. Regardless of whether the receiver output $RX_{LP}$ is a logic-high or a logic-low, the NAND gate 113 will output a logic-high to the receive pin RX thereby removing the unwanted oscillations caused by interference on the signal line MDI.

Figure 9:
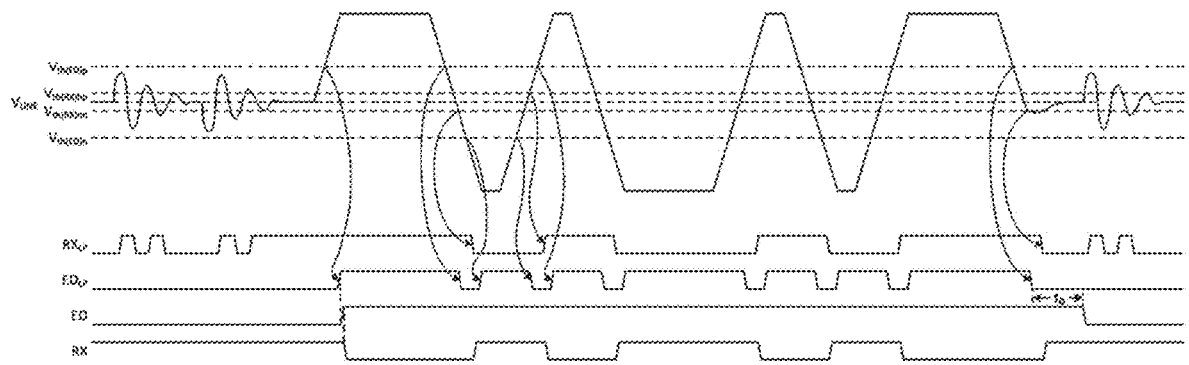
FIG. 9 shows the effect of the interference suppression module of FIG. 8 on the output of the receive pin.

FIG. 9 shows graphically how the receiver output $RX_{LP}$, the energy detection output $ED_{LP}$, the energy detection pin output ED and the receive pin output RX vary in response to a received voltage signal WINE for the Ethernet transceiver 101 of FIG. 8. As per the previous example, the receive pin output RX remains unaffected by noise in the silence state despite oscillations in the receiver output $RX_{LP}$. Furthermore, the time-delay unit 112 has helped to reduce the number of peaks during the active state resulting in the receive pin output RX being more representative of the received data (albeit in an inverted form).

Figure 10:
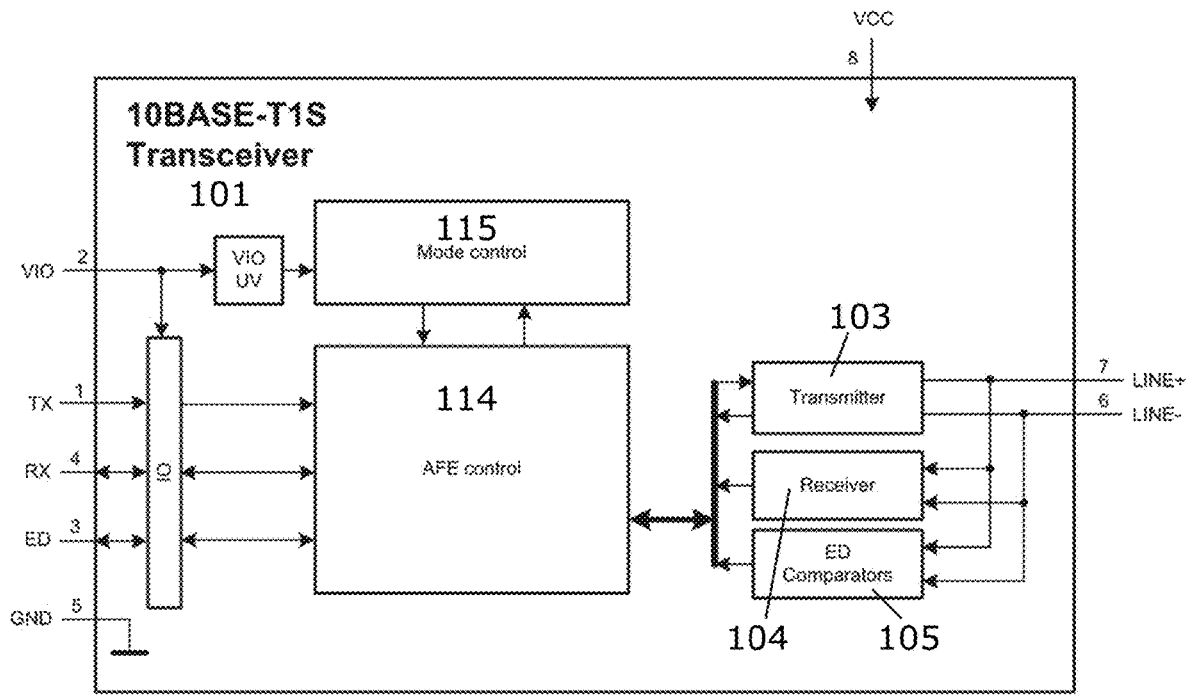
FIG. 10 shows an example embodiment of a 10BASE-T1S Ethernet transceiver comprising an interference suppression module.

FIG. 10 shows an example of a 10BASE-T1S Ethernet transceiver 101 comprising the interference suppression module 109 described herein. The Ethernet transceiver 101 comprises the transmitter module 103, the receiver module 104 and the energy detection module 105 as described previously. It also comprises various pins numbered 1-8. These include a 3-pin digital interface IO comprising the transmit pin TX (1), the receive pin RX (4) and the energy detection pin ED (3), and the pair of signal pins (7, 6) configured for connection to the positive LINE+ and negative LINE− signal lines of a single UTP respectively. There is also a main supply pin VCC (8) for connection to a voltage source, a reference supply pin VIO (2) for changing the voltage settings, and a ground pin GND (5) for earthing the device 101. The Ethernet transceiver 101 further comprises an analog frontend AFE control module 114 configured to control operation of the other modules (within which the interference suppression module 109 may be incorporated), and an undervoltage detection module VIO UV configured to, via a mode control module 115, place the Ethernet transceiver 101 into a safe state when the supply voltage becomes too low for normal operation.

Although the interference suppression module 109 has been described herein with reference to other components of the Ethernet transceiver 101, it could be formed independently of the other components and incorporated into the Ethernet transceiver 101 during a subsequent modular assembly process. In some cases, the interference suppression module 109 may even be retrofit to an existing Ethernet transceiver 101. Alternatively, the interference suppression module 109 may be integrated with the other components of the Ethernet transceiver 101 at the time of manufacture (e.g. as different parts/portions of the same chip).

Figure 11:
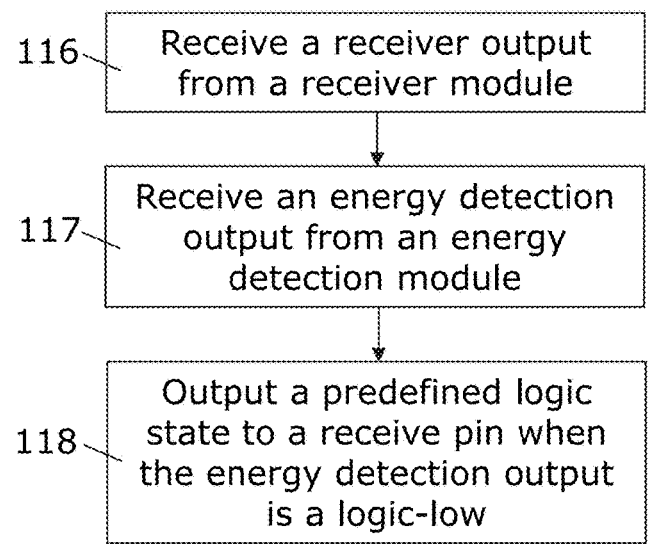
FIG. 11 shows a method of interference suppression in an Ethernet transceiver.

FIG. 11 illustrates schematically the main steps of a method of interference suppression in an Ethernet transceiver 101. As shown, the method comprises:
a. receiving 116 a receiver output from a receiver module 104 of the Ethernet transceiver 101, the receiver module 104 configured to output a logic-high when a received voltage signal is higher than a receiver threshold, and output a logic-low when the received voltage signal is lower than the receiver threshold;
b. receiving 117 an energy detection output from an energy detection module 105 of the Ethernet transceiver 101, the energy detection module 105 configured to output a logic-high when the received voltage signal is higher than a positive energy detection threshold or lower than a negative energy detection threshold, and output a logic-low when the received voltage signal is between the positive and negative energy detection thresholds; and
c. outputting 118 a predefined logic state to a receive pin RX of the Ethernet transceiver 101 when the energy detection output is a logic-low.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/ method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An interference suppression module for an Ethernet transceiver, the interference suppression module comprising circuitry configured to:
   receive a receiver output from a receiver module of the Ethernet transceiver, the receiver module configured to output a logic-high when a received voltage signal is higher than a receiver threshold, and output a logic-low when the received voltage signal is lower than the receiver threshold;
   receive an energy detection output from an energy detection module of the Ethernet transceiver, the energy detection module configured to output a logic-high when the received voltage signal is higher than a positive energy detection threshold or lower than a negative energy detection threshold, and output a logic-low when the received voltage signal is between the positive and negative energy detection thresholds; and
   output a predefined logic state to a receive pin of the Ethernet transceiver when the energy detection output is a logic-low.

2. The interference suppression module of claim 1, wherein the circuitry comprises an AND gate configured to receive the receiver output from the receiver module and the energy detection output from the energy detection module and output a logic-low to the receive pin when the energy detection output is a logic-low.

3. The interference suppression module of claim 1, wherein the circuitry comprises a NAND gate configured to receive the receiver output from the receiver module and the energy detection output from the energy detection module and output a logic-high to the receive pin when the energy detection output is a logic-low.

4. The interference suppression module of claim 1, wherein the circuitry is configured to output the predefined logic state to the receive pin when the energy detection output is a logic-low for a predefined time.

5. The interference suppression module of claim 2, wherein the circuitry comprises a time-delay unit configured to receive the energy detection output from the energy detection module and, when the energy detection output is a logic-low for a predefined time, pass the energy detection output to the AND gate.

6. The interference suppression module of claim 3, wherein the circuitry comprises a time-delay unit configured to receive the energy detection output from the energy detection module and, when the energy detection output is a logic-low for a predefined time, pass the energy detection output to the NAND gate.

7. The interference suppression module of claim 1, wherein the circuitry is configured to pass the receiver output to the receive pin when the energy detection output is a logic-high.

8. The interference suppression module of claim 1, wherein the circuitry is configured to output the energy detection output to an energy detection pin of the Ethernet transceiver.

9. The interference suppression module of claim 8, wherein the circuitry comprises a time-delay unit configured to receive the energy detection output from the energy detection module and, when the energy detection output is a logic-low for a predefined time, pass the energy detection output to the energy detection pin.

10. An Ethernet transceiver comprising the interference suppression module of claim 1.

11. The Ethernet transceiver of claim 10, wherein the receiver and energy detection modules each comprise one or more comparators for comparing the received voltage signal with the respective thresholds, and one or more low-pass filters configured to remove noise from the outputs of the comparators.

12. The Ethernet transceiver of claim 11, wherein the energy detection module comprises first and second comparators for comparing the received voltage signal with the respective positive and negative energy detection thresholds, and a XOR gate configured to provide the energy detection output based on the outputs of the first and second comparators.

13. The Ethernet transceiver of claim 10, wherein the receiver threshold comprises a predefined hysteresis.

14. The Ethernet transceiver of claim 10, further comprising one or more signal pins connectable to a signal line for receiving the received voltage signal over an Ethernet network.

15. The Ethernet transceiver of claim 14, wherein the one or more signal pins are configured to be connected to a signal line comprising a single unshielded twisted pair.

16. The Ethernet transceiver of claim 14, wherein the received voltage signal is a differential voltage signal.

17. The Ethernet transceiver of claim 10, wherein the Ethernet transceiver is a 10BASE-T1S transceiver.

18. An Ethernet Physical Layer comprising the Ethernet transceiver of claim 10.

19. A method of interference suppression in an Ethernet transceiver, the method comprising:
   receiving a receiver output from a receiver module of the Ethernet transceiver, the receiver module configured to output a logic-high when a received voltage signal is higher than a receiver threshold, and output a logic-low when the received voltage signal is lower than the receiver threshold;
   receiving an energy detection output from an energy detection module of the Ethernet transceiver, the energy detection module configured to output a logic-high when the received voltage signal is higher than a positive energy detection threshold or lower than a negative energy detection threshold, and output a logic-low when the received voltage signal is between the positive and negative energy detection thresholds; and
outputting a predefined logic state to a receive pin of the Ethernet transceiver when the energy detection output is a logic-low.

20. A non-transitory computer-readable medium storing instructions that, when executed by a computer, cause it to perform the method of claim 19.

\* \* \* \* \*